(12) United States Patent
Song

(10) Patent No.: US 11,633,945 B2
(45) Date of Patent: Apr. 25, 2023

(54) SHRINKABLE FILM CAPABLE OF BEING OVERLAPPED AND HEAT SEALED, PREPARATION METHOD THEREFOR, AND PACKAGING BAG PREPARED USING SAME

(71) Applicant: SUNRISE PACKAGING MATERIAL (JIANGYIN) CO., LTD., Wuxi (CN)

(72) Inventor: Johnson Song, Wuxi (CN)

(73) Assignee: SUNRISE PACKAGING MATERIAL (JIANGYIN) CO., LTD., Wuxi (CN)

( * ) Notice: Subject to any disclaimer, the term of this patent is extended or adjusted under 35 U.S.C. 154(b) by 171 days.

(21) Appl. No.: 16/958,128

(22) PCT Filed: Sep. 17, 2018

(86) PCT No.: PCT/CN2018/105915
§ 371 (c)(1),
(2) Date: Jun. 25, 2020

(87) PCT Pub. No.: WO2019/128320
PCT Pub. Date: Jul. 4, 2019

(65) Prior Publication Data
US 2020/0361193 A1 Nov. 19, 2020

(30) Foreign Application Priority Data
Dec. 26, 2017 (CN) .......................... 201711434628.2

(51) Int. Cl.
B32B 27/32 (2006.01)
B32B 7/12 (2006.01)
(Continued)

(52) U.S. Cl.
CPC ................ B32B 27/32 (2013.01); B32B 7/12 (2013.01); B32B 27/08 (2013.01); B32B 27/18 (2013.01);
(Continued)

(58) Field of Classification Search
CPC ......... B32B 27/32; B32B 27/08; B32B 27/18; B32B 27/304; B32B 27/306; B32B 7/12; B32B 2307/31
(Continued)

(56) References Cited

U.S. PATENT DOCUMENTS 5,279,872 A * 1/1994 Ralph ..................... B32B 27/32
426/127
2003/0157355 A1* 8/2003 Wallace .................. B32B 7/027
428/500

(Continued)

FOREIGN PATENT DOCUMENTS

CN 1411409 A 4/2003
CN 102248735 A 11/2011

OTHER PUBLICATIONS

International Search Report of PCT/CN2018/105915.
Written Opinion of PCT/CN2018/105915.

Primary Examiner — Betelhem Shewareged

(57) ABSTRACT

A shrinkable film capable of being overlapped and heat sealed, a preparation method for the film, and a packaging bag prepared using same, including outer surface layers and a heat sealing layer. Each outer surface layer includes a low-molecular weight compound and is subjected to electron cross-linking treatment, and the low-molecular weight compound is selected from paraffin, oleamide, stearic acid, and one or more of their derivatives. The low-molecular weight compound in each outer surface layer can, during overlapping and heat sealing, be migrated in a polymer under the action of being heated to influence movement of polymer molecular chains, and can be migrated to two molten interfaces to hinder mutual penetration of the polymer molecular chains. Further, by performing electronic cross-linking treatment on the outer surface layers, the outer surface layers form a polymer molecular chain cross-linking (Continued)

| A |
| B1 |
| B2 |
| C |
| D1 |
| D2 |
| E | structure, and the movement of the polymer molecular chains is reduced.

3 Claims, 1 Drawing Sheet

(51) Int. Cl.
    *B32B 27/08*     (2006.01)
    *B32B 27/18*     (2006.01)
    *B32B 27/30*     (2006.01)

(52) U.S. Cl.
    CPC .......... *B32B 27/304* (2013.01); *B32B 27/306* (2013.01); *B32B 2307/31* (2013.01)

(58) Field of Classification Search
    USPC ........................................................ 428/349
    See application file for complete search history.

(56) References Cited

U.S. PATENT DOCUMENTS

2004/0043167 A1*   3/2004   Holzem ................. B65D 31/02
                                                                                              428/35.2
2020/0361193 A1*  11/2020   Song ................... C09J 123/0853

\* cited by examiner

| A |
|---|
| B1 |
| B2 |
| C |
| D1 |
| D2 |
| E |

SHRINKABLE FILM CAPABLE OF BEING OVERLAPPED AND HEAT SEALED, PREPARATION METHOD THEREFOR, AND PACKAGING BAG PREPARED USING SAME

CROSS-REFERENCE TO RELATED APPLICATIONS

This application is a national stage application of PCT Application No. PCT/CN2018/105915. This Application claims priority from PCT Application No. PCT/CN2018/105915, filed Sep. 17, 2018, CN Application No. CN 201711434628.2, filed Dec. 26, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference were individually incorporated by reference.

TECHNICAL FIELD

The invention belongs to the technical field of packaging film, and relates to an overlapping heat sealable shrink film and the preparation method thereof.

BACKGROUND ART

Shrink films and bags are generally employed in packaging for meats, processed meats, marine products, cheese, and the like. Especially in irregular shape or commodity combination (cluster) packaging, shrink films and bags not only can assure the safety of food and prevent cross infection, but also can extend the shelf life of food. The properties required in shrink films and bags employed in food packing are exemplified as mentioned below: appropriate shrinking percentage, oxygen resistance, moisture resistance, impact resistance (puncture resistance), cold resistance, heat resistance, oil resistance and the like.

In order to improve the packaging efficiency of automatic or semi-automatic packaging equipment, it is necessary to heat seal multiple bags at the same time. However, it will fuse the bags overlapped together when multiple bags are sealed at the same time. To solve this problem, we used different materials for the outer layer and inner layer of the shrink film, aimed at expanding the melting temperature difference. The melting temperature of surface layer is no less than 65° C. to no more than 150° C. higher than that of the inner layer. The inner layer is usually composed of polyethylene, where the outer layer is composed of high melting point material such as nylon-6, 66/nylon-6 amide copolymer or a mixture thereof, homopolymer polypropylene and polyethylene terephthalate. Therefore, when bags are layered and heat sealed overlap together at the time, the inner layer forms an unpeelable interface and the outer layer forms a peelable and infusible interface, this allows the bags to achieve the effect of overlapping heat sealing. However, due to the large melting temperature difference between the outer layer and the inner layer, the operation difficulty of the shrink film in the multi-layer co-extrusion process is increased, and the controllability is not high. Furthermore, due to the melting point of the surface layer abovementioned is high, not only the energy consumption is large, but also the equipment requirements are high, the screw and mould of the equipment are not easy to clean.

Therefore, a heretofore unaddressed need exists in the art to address the aforementioned deficiencies and inadequacies.

DISCLOSURE OF THE INVENTION

The first object of the invention is to provide a shrink film that can be overlapped and heat sealable, in allusion to the large melting temperature difference between the surface layer and the inner layer of the shrink film and bag, and high requirements for equipment and production control of existing technology. Although the melting temperature difference between the outer layer and the inner layer is relatively low, when multiple bags are overlapped and heat sealed together, the inner layers of the bags can also form an interface that cannot be peeled off, and the outer surface layers of the two bags can form an interface that can be peeled off and infusible.

An overlapping heat sealable film or bag employed thereby of the invention comprises an outer layer and an inner layer. The surface layer contains low-molecular weight compounds and is treated by electron beam cross-linking. The low-molecular weight compounds are selected from paraffin, oleamide, stearic acid and one or more of their derivatives.

The present invention adds paraffin, oleamide, stearic acid and their derivatives into the surface layer. On the one hand, under the action of heat in the overlapping heat sealing, the movement speed of such compounds is greater than that of the polymer molecular chain, so they can migrate in the polymer and affect the movement of polymer chains. On the other hand, under the same pressure, low-molecular weight compounds such as paraffin, oleamide or stearic acid migrate more to the two melting layers, which can hinder the penetration of polymer chains. In addition, the invention also promotes the formation of polymer molecular chain cross-linked structure on the outer surface layer through electron beam irradiation on the outer surface layer, further reducing the movement of polymer molecular chains. Under the combined action of the above factors, when the multilayer shrink films are overlapped for heating extrusion and the adjacent surface of the two shrink films is the outer surface layer, they will not melt and bond easily and form a peelable interface. This is because the polymer chains are prevented from penetrating each other. In the above case, the melting temperature of outer surface material does not need to be much higher than that of the inner layer(just above 0° C. to 64° C. or even lower), which can be applied to the overlapping heat sealing of multiple bags.

The derivatives of oleamide include hydroxyl group, halogen, C1~C6 alkyl and other substituted oleamide compounds.

The derivatives of paraffin include hydroxyl group, halogen, C1~C6 alkyl and other substituted paraffin compounds.

The derivatives of stearic acid include stearate, substituted stearic acid, substituted stearate. Among them, stearate includes methyl stearate, ethyl stearate, propyl stearate, butyl stearate and so on. Stearate includes sodium salt, potassium salt, ammonium salt and so on. The substituent group in substituted stearic acid, substituted stearate, include hydroxyl group, halogen, C1~C6 alkyl and so on.

The content of the low molecular weight compounds in the outer layer is preferably 0.5 wt % to 50 wt %, more preferably 0.5 wt % to 30 wt %.

The material of outer layer (excluding the low molecular weight compound mentioned) is preferably at least one selected from polyolefin and ethylene copolymer.

After the addition of paraffin, oleamide, stearic acid and their derivatives, the surface (outer surface) of the polyolefin material forms many distribution points of the compound. Such compounds can prevent the effective fusion between polyolefin material molecular chains at these distribution points and with the increase of the amount of these compounds, the infusion points between the polyolefin chains increase. When the polyolefin material is impacted by the accelerated electron beam, the molecular chain forms a crosslinking structure. The higher the electron beam dose, the higher the crosslinking density and the crosslinking points of macromolecules are infusible and insoluble. When the above two factors work together, that is, with the weakened fusion points (compound action) increasing (because of the addition of such compounds, the original fusion points on the outer surface are weakened) and the crosslinking points increasing (the role of electron dose), a fusible and unpeelable interface is destroyed, forming a new infusible and peelable polyolefin heat sealing interface (outer surface).

The material of inner layer is preferably at least one selected from polyolefin, ethylene copolymer and surlyn.

In some of the preferred examples of the invention, there also includes an interlayer which composed of one or more mixtures of vinylidene chloride copolymer (PVdC), ethylene-vinyl alcohol copolymer, polyolefin, ethylene copolymer and surlyn in order to improve the barrier property of the overlapping heat sealable shrink film. Preferably choose the vinylidene chloride copolymer with good barrier properties.

In the present invention, the polyolefin is preferably selected from polypropylene (PP), low density polyethylene (LDPE) and linear low density polyethylene (LLDPE). Preferable melting temperature of polyolefin is 80° C. to 170° C., such as the linear low density polyethylene which melting temperature is 80° C. to 130° C. and the block copolymerization polypropylene which melting temperature is 158° C. to 165° C..

Ethylene copolymer is preferably selected from ethylene-vinyl acetate copolymer, ethylene-methyl acrylate copolymer, ethylene—acrylic acid copolymer and ethylene—maleic anhydride copolymer. The content of ethylene in ethylene copolymer is preferably 72 wt % to 96 wt %. Preferable melting temperature of ethylene copolymer is 60° C. to 110° C., for example, when the content of vinyl acetate in ethylene-vinyl acetate copolymer is 9% to 28%, the melting temperature is 70° C. to 110° C.; when the content of vinyl acetate in ethylene-vinyl acetate copolymer is 9% to 20%, the melting temperature is 85° C. to 100° C.

In some of the further preferred examples of the invention, the overlapping heat sealable shrink film includes layers of: a surface layer, an interlayer and an inner layer sequentially laminated in order thereof from outer to inner, wherein
the surface layer, containing 60 wt % to 95 wt % polyolefin, 3 wt % to 10 wt % ethylene copolymer and 2 wt % to 30 wt % low molecular weight compounds;
the interlayer, including at least one selected from vinylidene chloride copolymer, ethylene-vinyl alcohol copolymer, polyolefin, ethylene copolymer and surlyn;
the inner layer, containing 50 wt % to 100 wt % polyethylene and 0 wt % to 50 wt % ethylene-vinyl acetate copolymer.

The surface layer, interlayer and inner layer are preferably bonded by one or two adhesive layers respectively and the adhesive layer includes at least one selected from polyolefin, ethylene copolymer and surlyn.

The adhesive layer mainly plays the role of transitional bond and auxiliary barrier to facilitate the operation of multilayer co-extrusion process.

The adhesive layer between the surface layer and the interlayer contains two layers, the layer next to the outer layer is preferably a mixture of polyethylene and ethylene-vinyl acetate copolymer, or a mixture of polyethylene, ethylene-vinyl acetate copolymer and surlyn; the other layer next to the interlayer is preferably composed of ethylene-vinyl acetate copolymer, ethylene-acrylic acid copolymer, ethylene-ethyl acrylate polymer or ethylene—maleic anhydride copolymer.

The adhesive layer between the interlayer and the inner layer contains two layers, the layer next to the inner layer is preferably a mixture of ethylene-vinyl acetate copolymer and surlyn or a mixture of polyethylene and ethylene-vinyl acetate copolymer; the other layer next to the interlayer is preferably composed of ethylene-vinyl acetate copolymer, ethylene-acrylic acid copolymer, ethylene-ethyl acrylate polymer or ethylene-maleic anhydride copolymer.

In some of the further preferred examples of the invention, the overlapping heat sealable shrink film includes layers of: a surface layer, an interlayer and an inner layer sequentially laminated in order thereof from outer to inner, wherein
the surface layer, containing 60 wt % to 95 wt % polyethylene, 3 wt % to 10 wt % ethylene-vinyl acetate copolymer and 2 wt % to 30 wt % low molecular weight compounds;
the surface adhesive layer, containing 15 wt % to 25 wt % polyethylene and 75 wt % to 85 wt % ethylene-vinyl acetate copolymer;
the adhesive layer, which material is ethylene-vinyl acetate copolymer, ethylene-methyl acrylate copolymer, ethylene-acrylic acid copolymer or ethylene—maleic anhydride copolymer;
the interlayer, which material is vinylidene chloride copolymer;
the adhesive layer, which material is ethylene-vinyl acetate copolymer, ethylene-methyl acrylate copolymer, ethylene—acrylic acid copolymer or ethylene—maleic anhydride copolymer;
the inner adhesive layer, containing 15 wt % to 25 wt % polyethylene and 75 wt % to 85 wt % ethylene-vinyl acetate copolymer;
the inner layer, containing 50 wt % to 60 wt % polyethylene and 40 wt % to 50 wt % ethylene-vinyl acetate copolymer.

The second purpose of the invention is to provide a method for preparing the overlapping heat sealable shrink film, which comprises the following processing steps:
S1: Squeeze film tube out;
S2: Heat the co-extrusion tube and blow-mold to form a film bubble and obtain a bi-directional structure. After cooling and finalizing, the multi-layer co-extrusion shrink film is made;
S3: Electron beam crosslink the shrink film to form a polymer molecular chain crosslinked structure on the surface layer.

In Step 3, the voltage range is preferably 125 Kev to 500 Kev and the electron radiation dose is preferably 3 Mrad to 20 Mrad.

In some examples, 'Squeeze film tube out' in Step 1 refers to: put the raw materials of each layer in the extruder with multi-layer co-extrusion die head to produce the film tube.

The third purpose of the invention is to provide a packaging bag, which is made of the overlapping heat sealable shrink film. The packaging bag can be used for preservation of fresh meats, processed meats, marine products, cheese, and the like.

The positive effects of this invention are as mentioned below:

The present invention adds paraffin, oleamide, stearic acid and their derivatives into the surface layer. On the one hand, under the action of heat in the overlapping heat sealing, the movement speed of such compounds is greater than that of the polymer molecular chain, so they can migrate in the polymer and affect the movement of polymer chains. On the other hand, under the same pressure, low-molecular weight compounds migrate more to the two melting layers, which can hinder the penetration of polymer chains. In addition, the invention also promotes the formation of polymer molecular chain crosslinking structure on the outer surface layer through electron beam cross-linking on the outer surface layer, further reducing the movement of polymer molecular chains. Under the combined action of the above factors, when the multi-layer shrink films are overlapped for heating extrusion and the adjacent surface of the two shrink films is the outer surface layer, they will not melt and bond easily and form a peelable interface. This is because the polymer chains are prevented from penetrating each other. In the above case, the melting temperature of outer surface material does not need to be much higher than that of the inner layer (just above 0° C. to 64° C. or even lower), which can be applied to multiple bags with overlapping heat sealing.

In some of the preferred examples of the invention, resins with low melting point such as polypropylene, or a mixture of polyethylene and ethylene-vinyl acetate and the like, together with paraffin, oleamide, stearic acid and their derivatives are employed in the surface layer; a mixture of polyethylene and ethylene-vinyl acetate is employed in the inner layer, which has a good property of melt bonding. Although the melting temperature of the surface layer is only 0° C. to 64° C. higher than that of the inner layer, it can realize the overlapping heat sealing of multiple bags as well, while the outer surfaces of bags are peelable and infusible. In this way, resins with lower melting point and lower processing difficulty can be used in the outer layer of the film. Firstly, the requirements for equipment and energy consumption can be reduced reasonably. Secondly, the resin with low melting point has better controllability in processing. Thirdly, the resin with low melting point is easier to clean in the equipment screw and mold.

The experiment shows that, among the preferred examples of the invention, it has a better melt bonding property and can effectively improve the heat sealing of the bag when a mixture of 50 wt % to 60 wt % polyethylene and 40 wt % to 50 wt % ethylene-vinyl acetate copolymer is employed in the inner layer; when the outer layer contains 60 wt % to 95 wt % polyethylene, 3 wt % to 10 wt % ethylene-vinyl acetate copolymer and 2 wt % to 30 wt % paraffin, oleamide or stearic acid, wherein polyethylene and ethylene-vinyl acetate copolymer can synergize and effectively reduce the melting adhesion of the outer layer. The mixing of these three materials can make the melting temperature of the surface layer low and make it not easy to bond, which is the basis of realizing the peelable and infusible properties of outer layers when multiple bags are overlapped and heat sealed together. It also ensures the melting temperature of the surface layer is only 0° C. to 39° C. higher than that of the inner layer and effectively reduces energy consumption and make it more convenient to process. The outer adhesive layer contains 15 wt % to 25 wt % polyethylene and 75 wt % to 85 wt % ethylene-vinyl acetate copolymer, while the adhesive layer is composed of ethylene-vinyl acetate copolymer, the transition of two layers makes the outer layer and the interlayer bond effectively. Similarly, the interlayer and the inner layer are also bonded by two layers of transition.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

FIG. 1 is a schematic view showing the structure of an overlapping heat sealable shrink film in Examples 2-7 of this invention.

SPECIFIC METHODS FOR CARRYING OUT THE INVENTION

Hereinafter the present invention will be explained in greater detail using Examples and Comparative Examples. However, the present invention is not limited by these specific examples, and any technical person with knowledge of this field may achieve similar results by making some changes to the present invention, which are also included in the present invention.

EXAMPLES 1-7 AND COMPARATIVE EXAMPLES 1-8

TABLE 1

| Raw Material | |
|---|---|
| Raw Material | Melting temperature |
| LLDPE1 | 100° C. |
| LLDPE2 | 104° C. |
| EVA1 (10% VA) | 98° C., 100° C. |
| EVA2 (18% VA) | 89° C., 86° C. |
| LLDPE | 123° C. |
| PP (block copolymerization) | 162° C. |
| Surlyn | 98° C. |
| PA6,66copolymer | 190° C. |
| PA6I/6T | — |
| Tie (Adhesive resin) | 119° C. |
| stearic acid | 144° C. |

TABLE 2

Raw Material and Mass Percentage of Each Layer in Examples 1-7 and Comparative Examples 1-8

| | Inner layer E | Adhesive layerD2 | Adhesive layerD1 | Interlayer C | Adhesive layerB2 | Adhesive layerB1 | Outer layer A |
|---|---|---|---|---|---|---|---|
| Example 1 | 55% LLDPE 45% EVA2 | — | — | — | — | — | 90% LLDPE 5% EVA2 5% stearic acid |
| Example 2 | 55% LLDPE 45% EVA2 | 20% LLDPE 80% EVA2 | EVA2 | PVdC | EVA2 | 20% LLDPE 80% EVA2 | 90% LLDPE1 5% EVA2 5% stearic acid |
| Example 3 | 55% LLDPE 45% EVA2 | 20% LLDPE 80% EVA2 | EVA2 | PVdC | EVA2 | 20% LLDPE 80% EVA2 | 90% LLDPE 5% EVA2 5% stearic acid |
| Example 4 | 55% LLDPE 45% EVA2 | 20% LLDPE 80% EVA2 | EVA2 | PVdC | EVA2 | 20% LLDPE 80% EVA2 | 90% LLDPE 9.5% EVA2 0.5% oleamide |
| Example 5 | 55% LLDPE 45% EVA2 | 20% LLDPE 80% EVA2 | EVA2 | PVdC | EVA2 | 20% LLDPE 80% EVA2 | 75% LLDPE 5% EVA2 20% oleamide |
| Example 6 | 55% LLDPE 45% EVA2 | 20% LLDPE 80% EVA2 | EVA2 | PVdC | EVA2 | 20% LLDPE 80% EVA2 | 65% LLDPE 5% EVA2 30% butyl stearate |
| Example 7 | 55% LLDPE 45% EVA2 | 20% LLDPE 80% EVA2 | EVA2 | PVdC | EVA2 | 20% LLDPE 80% EVA2 | 45% LLDPE 5% EVA2 50% butyl stearate |
| Comp. Ex. 1 | 55% LLDPE 45% EVA2 | 20% LLDPE 80% EVA2 | EVA2 | PVdC | EVA2 | 20% LLDPE 80% EVA2 | 90% LLDPE 10% EVA2 |
| Comp. Ex. 2 | 55% LLDPE 45% EVA2 | 20% LLDPE 80% EVA2 | EVA2 | PVdC | EVA2 | 20% LLDPE 80% EVA2 | 90% LLDPE1 10% EVA2 |
| Comp. Ex. 3 | 75% POP1 25% POP2 | 30% Surlyn 70% EVA2 | EVA2 | PVdC | EVA2 | 30% Surlyn 70% EVA2 | 68% PP 32% POP3 |
| Comp. Ex. 4 | 65% LLDPE 35% EVA1 | 50% LLDPE 50% EVA1 | EVA1 | PVdC | EVA1 | 30% LLDPE 70% EVA1 | 50% LLDPE 50% EVA1 |
| Comp. Ex. 5 | 50% POP2 50% EVA1 | 20% POP2 60% EVA2 20% Surlyn | EVA2 | PVdC | EVA2 | Tie | 80% PA6,66 20% PA6I/6T |
| Comp. Ex. 6 | 50% POP2 50% EVA1 | 20% POP2 60% EVA2 20% Surlyn | EVA2 | PVdC | EVA2 | 20% LLDPE 60% EVA2 20% Surlyn | PP |
| Comp. Ex. 7 | 50% POP2 50% EVA1 | 20% POP2 60% EVA2 20% Surlyn | EVA2 | PVdC | EVA2 | 20% LLDPE 60% EVA2 20% Surlyn | 68% PP 32% LLDPE2 |
| Comp. Ex. 8 | 55% LLDPE 45% EVA2 | 20% LLDPE 80% EVA2 | EVA2 | PVdC | EVA2 | 20% LLDPE 80% EVA2 | 90% LLDPE 5% EVA2 5% stearic acid |

In Examples 1-7 and Comparative Examples 1-7, shrink films are prepared by the following three steps:

S 1: Put the raw materials of each layer shown in Table 2 into a co-extrusion extruder with a multi-layer co-extrusion die head to produce a film tube and then cool the film tube;

S2: Heat the co-extrusion tube and blow-mold to form a film bubble and obtain a bi-directional structure. After cooling and finalizing, the multi-layer co-extrusion shrink film is made;

S3: Electron beam irradiation the shrink film to form a polymer molecular chain crosslinked structure on the outer layer. The voltage range is 125 Kev to 500 Kev and the electron radiation dosage is 3 Mrad to 20 Mrad.

Among them, the film of Example 1 has a two-layer structure and the films of Examples 2-6 and Comparative Examples 1-7 have a seven-layer structure. The outer layers in Comparative Examples 1-7 do not have low molecular weight compounds such as stearic acid.

The raw materials of Comparative Example 8 are the same as Example 3, but the shrink film is prepared according to Step 1 to Step 2, without the electron beam irradiation in Step 3.

Performance test and overlapping heat sealing test of shrink film prepared in Examples 1-7 and Comparative Examples 1-8.

The contents of overlapping heat sealing test are as follows: Overlap two or three bags together for vacuum sealing and repeat the trial for 10 times; Adhesion refers to the times that the outer surfaces of two bags are fused together and unpeelable, the more the times, the worse the overlapping heat sealing effect will be; Tight sealing refers to the times that the outer surfaces of two bags stick together, but separate after the thermal shrinking, the less the times, the better the overlapping heat sealing effect will be.

The performance test and the overlapping heat sealing test results are shown in Table 3.

TABLE 3

The Performance Results of Examples 1-7 and Comparative Examples 1-8

| | Exterior/interior difference in resin melting temperature ° C. | Layer ratio % | 80° C. Thermal shrinkage rate % MD/TD | Degree of haze % | Stretching power MPa MD/TD | Overlapped heat sealing property (two bags) fusion/adherence* | Overlapped heat sealing property (three bags) fusion/adherence* |
|---|---|---|---|---|---|---|---|
| Example 1 | 34-37 | 40/60 | 32/35 | 16.2 | 47/49 | 0/0 | 0/0 |
| Example 2 | 18-39 | 12/15/10/6/12/20/25 | 41/51 | 17.11 | 55/58 | 0/0 | 0/0 |
| Example 3 | 0 | 12/15/10/6/12/20/25 | 38/46 | 15.53 | 50/52 | 0/0 | 0/0 |
| Example 4 | 0 | 12/15/10/6/12/20/25 | 38/45 | 15.83 | 51/52 | 0/0 | 0/1 |
| Example 5 | 0 | 12/15/10/6/12/20/25 | 39/46 | 16.12 | 50/52 | 0/0 | 0/0 |
| Example 6 | 0 | 12/15/10/6/12/20/25 | 37/43 | 15.64 | 49/50 | 0/0 | 0/0 |
| Example 7 | 0 | 12/15/10/6/12/20/25 | 36/41 | 16.42 | 48/49 | 0/0 | 0/0 |
| Comp. Ex. 1 | 0 | 12/15/10/6/12/20/25 | 39/46 | 15.54 | 48/49 | 10/0 | 10/0 |
| Comp. Ex. 2 | −19 | 12/15/10/6/12/20/25 | 40/46 | 16.44 | 49/51 | 10/0 | 10/0 |
| Comp. Ex. 3 | 94 | 12/17/9/6/12/23/21 | 45/60 | 21 | 48/49 | 0/1 | 0/10 |
| Comp. Ex. 4 | 0 | 12/15/10/6/10/20/27 | 30/40 | 15 | 40/50 | 10/0 | 10/0 |
| Comp. Ex. 5 | 122 | 12/10/15/6/15/20/22 | 35/46 | 10 | 51/58 | 0/10 | 0/10 |
| Comp. Ex. 6 | 62-64 | 12/19/12/6/11/20/20 | 38/47 | 15.14 | 50/55 | 0/0 | 0/2 |
| Comp. Ex. 7 | 62-64 | 12/19/12/6/11/20/20 | 41/50 | 16.18 | 49/53 | 0/0 | 0/3 |
| Comp. Ex. 8 | 0 | 12/15/10/6/12/20/25 | 38/46 | 16.48 | 40/45 | 10/0 | 10/0 |

From the results in Table 3, the melting temperature of the inner and outer layers of Comparative Examples 1, 2, 4 and 8 are similar. However, under the condition of without low-molecular weight compounds (Comparative Examples 1 and 2) or without electron beam irradiation the outer layer (Comparative Example 8), the overlapping heat sealing effect is poor and the bags adhered seriously. The melting temperature difference between the inner and outer layers of Comparative Example 3 and Comparative Example 5 is large, even it is better in anti-adhesion performance, but poor in tight sealing performance. Comparative Examples 6 and 7 also have the problem of poor tight sealing performance when the bags are overlapped and heat sealed together. It can be seen that the Comparative Examples 1-8 cannot meet the requirements of better sealing and anti-adhesion performance which cannot be applied to the overlapping heat sealing of multiple bags. Low-molecular weight compounds are employed in the outer layers of films in Examples 1-7 and the outer layers are treated by electron beam irradiation, so they are not easy to adhere when heated. Although the melting temperature difference between the inner and outer layers is 0° C. to 64° C., there is still a better sealing performance At the same time, it can effectively prevent the adhesion between the two bags and the bags can still be easily separated after thermal shrinking, so Examples 1-7 are applicable to the overlapping heat sealing of multiple bags.

Moreover, there is no obvious difference in the term of shrinking performance between Examples 1-7 and Comparative Examples 1-8, including machining direction (MD) and transverse direction (TD), degree of haze (transparency) and stretching power.

The preferred examples of the invention have been explained in detail above. However, the present invention is not limited by these specific examples, and under the precondition of subjecting the spirit of the invention, any technical person with knowledge of this field may achieve similar results by making some changes to the present invention, which are also included in the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An overlapping heat sealable shrink film, including an outer layer and a heat sealing layer, wherein the outer layer contains Polyolefin, Ethylene copolymer, low molecular weight compounds and is after electronically crosslinked treatment, the material of the heat sealing layer is one or more of Polyolefin, Ethylene copolymer and Surlyn, the low molecular weight compounds are selected from one or more of Paraffin, Oleamide, Stearic acid and their derivatives, and the Ethylene copolymer is selected from Ethylene-Vinyl acetate copolymer, Ethylene-Methyl acrylate copolymer, Ethylene-Acrylic acid copolymer and Ethylene-Maleic anhydride copolymer;

wherein the overlapping heat sealable shrink film contains the following layers from outside to inside: outer layer, containing 60 wt % to 95 wt % Polyolefin, 3 wt % to 10 wt % Ethylene copolymer and 2 wt % to 30 wt % low molecular weight compounds;

intermediate layer, wherein the material is one or more of Vinylidene chloride copolymer, Ethylene vinyl alcohol copolymer, Polyolefin, Ethylene copolymer and Surlyn; and wherein sealing layer contains 50 wt % to 100 wt % Polyethylene and 0 wt % to 50 wt % Ethylene-vinyl acetate copolymer.

2. The overlapping heat sealable shrink film as stated in claim 1, wherein the content of the low molecular weight compounds in the outer layer is 0.5~50 wt %.

3. The overlapping heat sealable shrink film as stated in claim 1, wherein the outer layer and the intermediate layer, the intermediate layer and the heat sealing layer are respectively bonded by one or two adhesive layers; and wherein material of the adhesive layer is one or more of Polyolefin, Ethylene copolymer and Surlyn.

\* \* \* \* \*